United States Patent
Reitmeier et al.

(10) Patent No.: US 9,420,230 B2
(45) Date of Patent: Aug. 16, 2016

(54) DISTRIBUTED COMPOSITION OF BROADCAST TELEVISION PROGRAMS

(75) Inventors: Glenn A. Reitmeier, Yardley, PA (US); Peter Smith, Wayne, NJ (US); Thomas M. Duff, Ridgefield, CT (US); Michael F. Steib, New York, NY (US)

(73) Assignee: NBCUniversal Media, LLC, Wilmington, DE (US)

(*) Notice: Subject to any disclaimer, the term of this patent is extended or adjusted under 35 U.S.C. 154(b) by 1751 days.

(21) Appl. No.: 11/272,043

(22) Filed: Nov. 14, 2005

(65) Prior Publication Data

US 2006/0130111 A1 Jun. 15, 2006

Related U.S. Application Data

(60) Provisional application No. 60/627,084, filed on Nov. 12, 2004.

(51) Int. Cl.
| | |
|---|---|
| H04N 7/10 | (2006.01) |
| H04N 7/025 | (2006.01) |
| H04N 7/16 | (2011.01) |
| H04H 20/10 | (2008.01) |
| H04N 5/445 | (2011.01) |
| H04N 7/173 | (2011.01) |
| H04N 21/234 | (2011.01) |
| H04N 21/235 | (2011.01) |
| H04N 21/236 | (2011.01) |
| H04N 21/2365 | (2011.01) |
| H04N 21/258 | (2011.01) |
| H04N 21/2668 | (2011.01) |
| H04N 21/431 | (2011.01) |
| H04N 21/434 | (2011.01) |
| H04N 21/435 | (2011.01) |

(Continued)

(52) U.S. Cl.
CPC ............ *H04N 7/16* (2013.01); *H04H 20/103* (2013.01); *H04N 5/44591* (2013.01); *H04N 7/17318* (2013.01); *H04N 21/235* (2013.01); *H04N 21/2365* (2013.01); *H04N 21/23424* (2013.01); *H04N 21/23614* (2013.01); *H04N 21/25841* (2013.01); *H04N 21/2668* (2013.01); *H04N 21/435* (2013.01); *H04N 21/4312* (2013.01); *H04N 21/4314* (2013.01); *H04N 21/4347* (2013.01); *H04N 21/4348* (2013.01); *H04N 21/8126* (2013.01); *H04N 21/8547* (2013.01); *H04N 7/088* (2013.01)

(58) Field of Classification Search
USPC .......................................... 725/36
See application file for complete search history.

(56) References Cited

U.S. PATENT DOCUMENTS

| | | | |
|---|---|---|---|
| 6,169,541 B1 | 1/2001 | Smith | |
| 6,177,931 B1 * | 1/2001 | Alexander et al. | 725/52 |

(Continued)

OTHER PUBLICATIONS http://en.wikipedia.org/wiki/XML.*

(Continued)

*Primary Examiner* — Nasser Goodarzi
*Assistant Examiner* — Fred Peng
(74) *Attorney, Agent, or Firm* — Fletcher Yoder, P.C.

(57) ABSTRACT

Described are methods and systems for combining programming content in a controlled synchronized manner. The systems and methods allow for centrally generated content to be modified using local content. The centrally generated content can include data that specifies what portions of the centrally generated content can be modified by the local content.

36 Claims, 6 Drawing Sheets

(51) Int. Cl.
    *H04N 21/81*     (2011.01)
    *H04N 21/8547*     (2011.01)
    *H04N 7/088*     (2006.01)

(56) References Cited

U.S. PATENT DOCUMENTS

| | | | |
|---|---|---|---|
| 6,211,921 B1 | 4/2001 | Cherian et al. | |
| 6,326,982 B1 | 12/2001 | Wu et al. | |
| 6,760,916 B2* | 7/2004 | Holtz et al. | 725/34 |
| 6,799,326 B2* | 9/2004 | Boylan et al. | 725/35 |
| 6,829,301 B1* | 12/2004 | Tinker et al. | 375/240.12 |
| 7,068,724 B1* | 6/2006 | Hamilton | 375/240.26 |
| 2002/0131511 A1* | 9/2002 | Zenoni | 375/240.28 |
| 2003/0037332 A1* | 2/2003 | Chapin et al. | 725/35 |
| 2005/0060759 A1* | 3/2005 | Rowe et al. | 725/143 |
| 2005/0278635 A1* | 12/2005 | Zhu et al. | 715/723 |
| 2008/0189746 A1* | 8/2008 | Boyer et al. | 725/40 |
| 2009/0094637 A1* | 4/2009 | Lemmons | 725/32 |

OTHER PUBLICATIONS http://en.wikipedia.org/wiki/Macroblock.*
International Search Report mailed on Feb. 6, 2007 for International Patent Application No. PCT/US05/41232. 2 pages.

* cited by examiner

DISTRIBUTED COMPOSITION OF BROADCAST TELEVISION PROGRAMS

RELATED APPLICATIONS

This application claims the benefit of provisional application 60/627,084, filed Nov. 12, 2004.

FIELD OF INVENTION

The present invention relates to methods and systems for combining programming content in a controlled synchronized manner. The systems and methods allow the combined content to be delivered simultaneously to users as part of a standard programming signal.

BACKGROUND OF THE INVENTION

It is desirable for certain channels of television programming to contain both national and local content elements. Traditionally, this is accomplished by creating time slots during which each of the various elements occupies. A conventional television distribution system provides a national (or regional) network feed, with time slots that are available for the insertion of locally generated content (or ads) at a broadcast network affiliate station or a cable headend and a means for signaling the availability of a time slot for local insertion of content. However, not every broadcast network affiliate station or cable headend may have the equipment and/or the content available to perform a local insertion, thus, common industry practice is to have a network feed contain promotional or other "filler" content which may be replaced by locally generated content, but which will be sent to the viewers in case such locally generated content is not available.

Some types of television programming such as news, weather, sports etc. tend to be more informational and lend themselves to the use of graphics and text content elements to convey information to the viewer. Examples include MSNBC and CNBC, which each use a particular layout format of full motion video with additional graphics and text elements in a format that is appropriate to their content. In such cases it is common practice to compose the programming by segmenting the screen into various windows of information. Such programming is produced and distributed in a conventional way, with time slots available for local insertion of content.

Conventional television productions segment the program into a video portion and various graphics elements. But the segmentation of the screen and the generation and overlay of the graphics elements is all performed as part of the program production, that is, in the control room where the program is being produced. Conventionally, once a program leaves the control room it is considered "finished" and there is no change made to it as it goes through various stages of distribution to the consumer. Consequently, only the video information is typically conveyed through the distribution chain.

Accordingly, a need exists for an efficient way of combining national and local content in the same viewer screen at the broadcast network affiliate station or cable headend.

SUMMARY OF THE INVENTION

Methods and systems for combining programming content in a controlled synchronized manner are provided. One embodiment is a method of distributing customizable program content. The method includes distributing a program including multiple program segments configured to be displayed simultaneously on different portions of a display, and distributing data comprising an indication of which segments can be subsequently modified.

Preferably, the program is a television program or a web site. Preferably, the data also includes the location of one or more program segments, the size of one or more program segments, or the duration of one or more program segments.

Preferably, the data and the television program are distributed simultaneously as part of the same program signal. The program signal may be an analog or digital program signal. Preferably, the program signal is in a compressed format, for example MPEG-2 format, and the multiple program segments are horizontally and vertically sized to have dimensions that are an integer multiple of a macroblock size, and wherein edges of the multiple program segments align with macroblock boundaries.

Preferably, the program is a nationally broadcast television program. Preferably, the method also includes modifying one or more program segments. A preferred modification is replacing the one or more program segments with local content. The modification may include modifying only part of one or more segments. Preferably, the modified program is distributed to one or more users.

Another embodiment is a method of customizing program content comprising. The method includes receiving a program comprising multiple program segments configured to be displayed simultaneously on different portions of a display, receiving data comprising an indication of which segments can be subsequently modified, and modifying one or more segments to produce a modified program. Preferably, the modified program is distributed to one or more users. Preferably, it is distributed to a plurality of users. Preferably, the data and the television program are received simultaneously as part of the same program signal.

Yet another embodiment is a computer readable media having computer readable code which when executed by a computer system causes the computer system to implement a method for customizing program content. The method implemented by the code includes modifying a program comprising multiple program segments configured to be displayed simultaneously utilizing data that includes an indication of which segments may be modified. Preferably, the data also includes the location, size or timing of the segments.

Another embodiment is a system for customizing program content. The system includes a computer system, and an application program for modifying a program including multiple program segments configured to be displayed simultaneously utilizing data that includes an indication of which segments may be modified.

DESCRIPTION OF THE DRAWINGS

The invention can be understood by reference to the Detailed Description of the Invention when taken together with the attached drawings, wherein.

DETAILED DESCRIPTION OF THE INVENTION

Described are methods and systems for combining programming content in a controlled synchronized manner. This allows the combined content to be delivered simultaneously to users as part of a standard programming signal.

The present invention provides for the modification of major content elements "downstream" from a program's original production. This modification can include insertion or replacement of content in the original program. For example, an original program having centrally produced program elements can be created. Subsequent modification of elements in this original program can then be made downstream, for example at a local broadcast station or cable headend, in a coordinated manner.

To facilitate the modification of the centrally produced original program, the downstream station preferably receives data indicating where and when in the original program modifications can be made.

Figure 1:
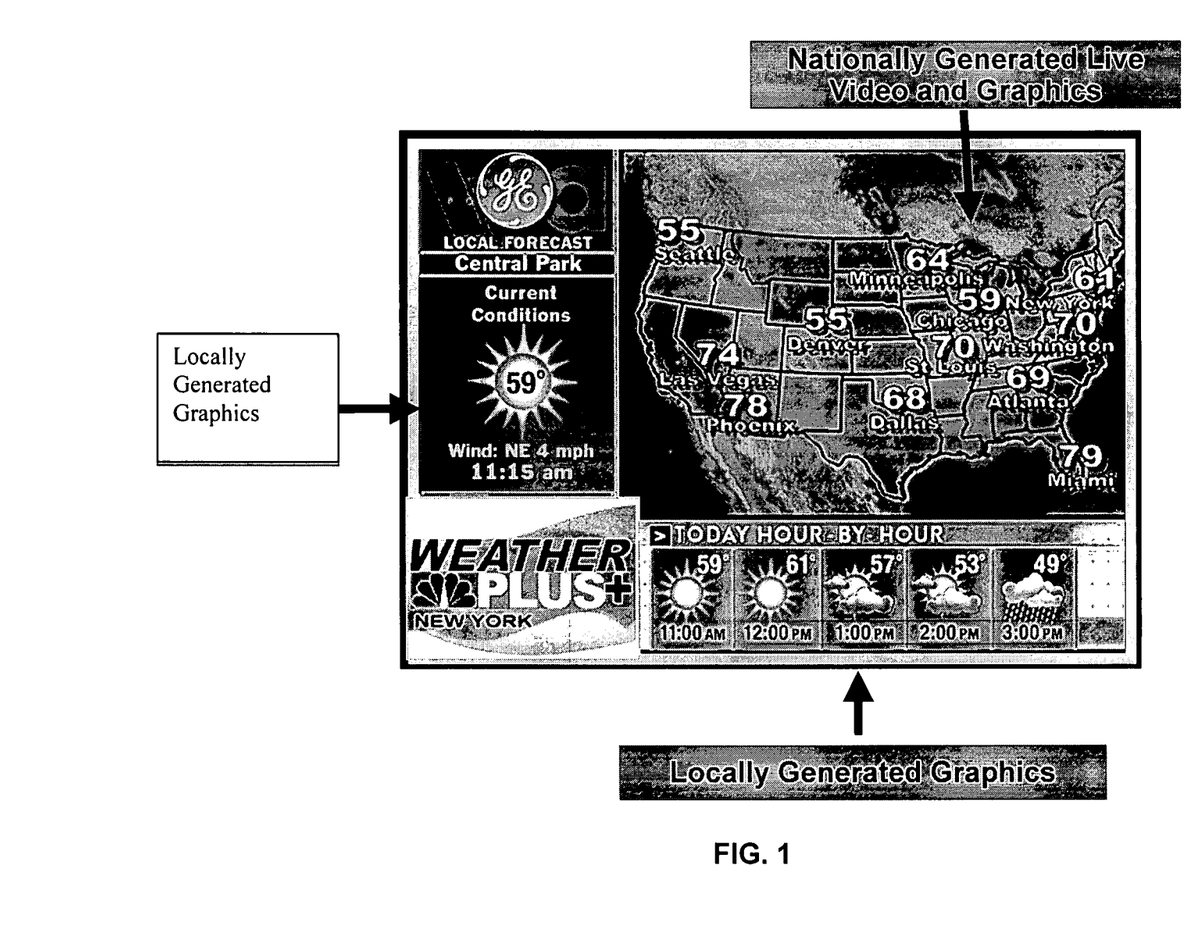
FIG. 1, is a screen shot showing nationally and locally generated screen windows in accordance with an embodiment of the invention.

FIG. 1 is an example of the combination of nationally and locally generated screen windows displayed simultaneously as a combined program. In FIG. 1 the nationally generated live video and graphics are surrounded by three locally generated graphic windows. The locally generated windows are specific to the New York area and include the current weather conditions for New York, an identification of the local station, and the hour-by-hour forecast for New York. Accordingly, a viewer of the combined program in FIG. 1 is able to get an overview of the weather across the nation along with more specific details concerning weather in their area.

A local affiliate station or a cable headend preferably receives an original national program feed in which the screen has been segmented into predetermined windows. Each of the windows in the original national program feed is preferably occupied by some nationally generated content at all times. In this manner a local affiliate can choose to insert local content into one or more windows originally occupied by national content. By having all windows in originally occupied by national content, however, the local affiliate can choose to leave the national content unaltered without delivering an incomplete program to viewers.

To facilitate the modification of the centrally generated content to include locally generated content, the centrally generated content is preferably distributed to the local facilities with data that indicates where the centrally generated content can be modified to include locally generated content. Additional data that can be distributed with the centrally generated content can include the time in which the locally generated content can be inserted and the type of content to be inserted into the centrally generated content.

Preferably, the centrally generated content is partitioned into windows or segments. For example, in an embodiment suitable for digital television, the centrally generated content screen is partitioned into windows with locations that correspond to the macroblock boundaries of the final digitally compressed stream, and a size that corresponds to an integer number of macroblocks. A preferred type of digital stream is a MPEG-2 stream. In a MPEG-2 stream a macroblock is a 16×16 pixel area of the screen.

Figure 2:
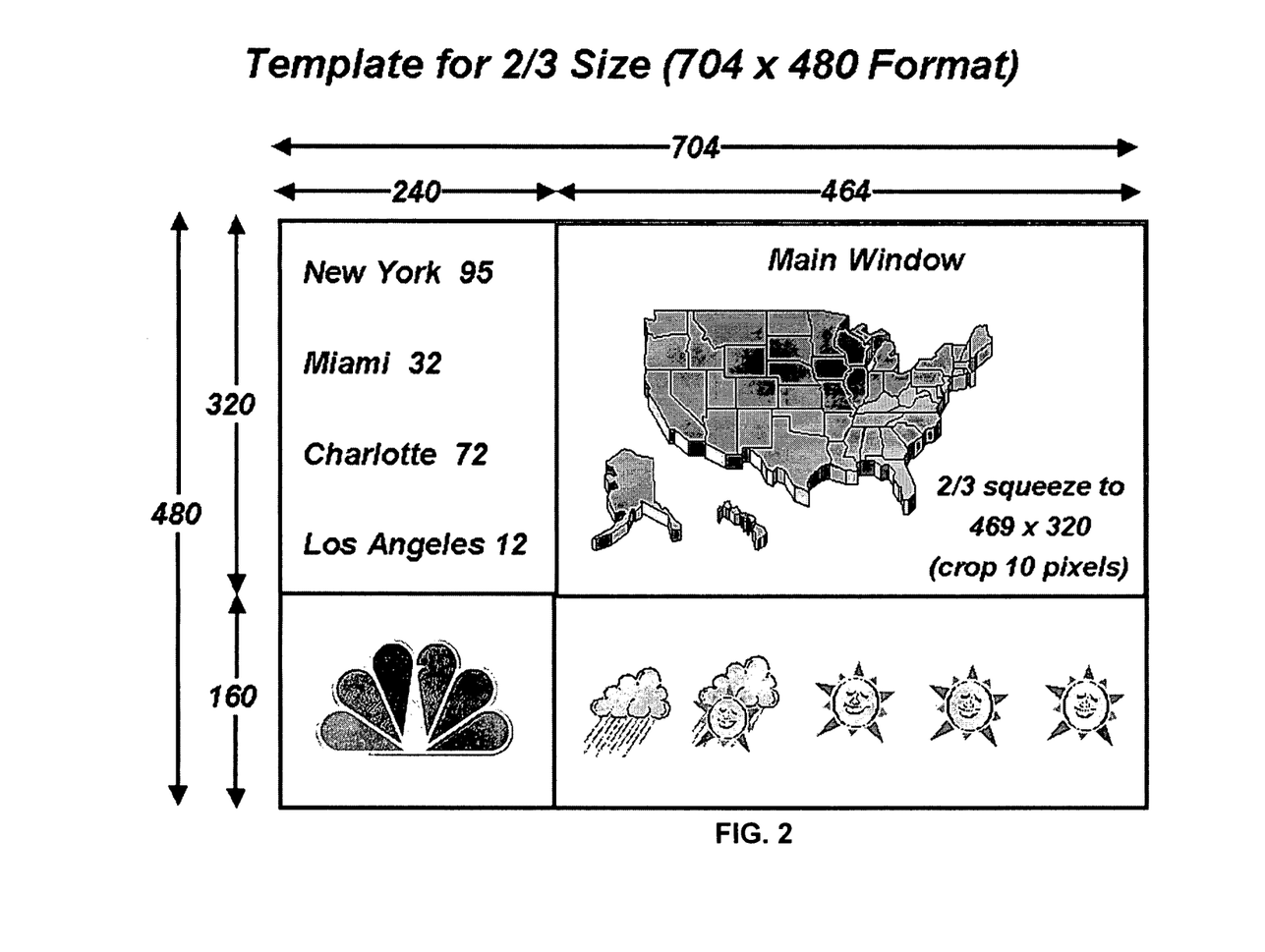
FIG. 2 is an example of MPEG aligned screen windows in which each screen window is a multiple of 16 in accordance with an embodiment of the invention.

FIG. 2 shows an example of MPEG aligned screen windows in which each window dimension is a multiple of 16. In FIG. 2, the main window is centrally generated national content. Locally generated content is then inserted into one ore more of the surrounding windows. By dimensioning the screen windows in multiples of 16, the local content can easily be positioned within the MPEG stream by modifying whole macroblocks within the original centrally generated stream.

FIG. 2 shows an embodiment in which the screen windows each include separately identifiable content. In this embodiment, each of the windows may or may not include a visually perceptible boundary around the window. In an alternative embodiment, the screen windows may not each contain separately identifiable content. In this embodiment, screen windows in which locally inserted content can be inserted may be portions of centrally generated images that may modified. For example, the locally content may be placed around the boundaries of a centrally generated image by cropping the centrally generated image. The location of the screen windows can then be used to identify which portions of the centrally generated image may or may not be modified.

Figure 3:
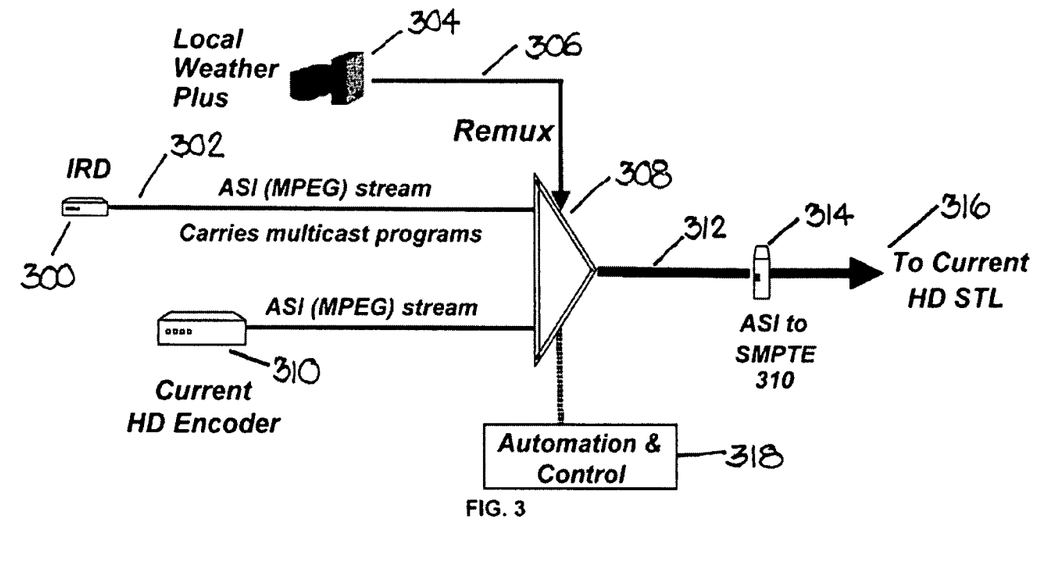
FIG. 3 is a diagram of a local content insertion system for graphics in accordance with an embodiment of the invention.

FIG. 3 shows an embodiment of a system for combining local content with centrally generated content. The system allows for locally generated graphics, text and/or still images to be overlaid directly on an incoming digitally compressed (MPEG-2) stream.

In FIG. 3 integrated receiver descrambler (IRD) 300 receives and descrambles centrally generated content 302. The centrally generated content 302 preferably includes data which indicates what portion of the centrally generated may be modified, for example by overlaying locally generated content. Locally generated content 306 generated and or stored on computer system 304 is transferred to a device 308 that is capable of performing compressed-domain logo insertion, for example, MPEG Remultiplexer devices such as the TERAYON CHERRYPICKER and the LEITCH DTP processor. Computer system 304 arranges the locally generated content 306 to fit into one or more portions of the centrally generated content that have been identified as modifiable. The MPEG Remultiplexer 308 then places the locally generated content 306 into these portions of the centrally generated content.

The locally generated content on computer system 304 may be stored and/or retrieved from various memory devices connected to computer system 304. These devices include a hard drive, flash memory, optical drives such as CR-ROM or CD-ROM R/W, DVD or other magnetic, optical, electronic or other media stores.

The MPEG Remultiplexer 308 also combines other MPEG encoded programs into the DTV multiplex signal 312, such as a primary network program that is MPEG encoded using encoder 310. Signal input and output from MPEG Remultiplexer 308 may be may be in ASI "asynchronous serial interface" ("ASF") format (which refers to a DVB interface standard for carrying an MPEG-2 compressed video signal on a coaxial cable) or an appropriate speed data link such as Ethernet or Firewire (IEEE 1394). The combined DTV multiplex signal 312 can subsequently be converted into SMPTE 310 or other standard interface format at 314 before being delivered to an over-the-air transmitter via a Studio-Transmitter Link (STL) 316 and/or to a cable transmitter (not shown).

The automation and control of the combination of video streams can be handled by known computer system 318 properly configured. The computer system may include at least one central processing unit or CPU (processor) connected to a host bus. The CPU may be any of various types, including an x86 processor, e.g., a Pentium class, a PowerPC processor, a CPU from the SPARC family of RISC processors, as well as others. The computer system may also include various memory mediums, typically including RAM and referred to as main memory. The main memory may store one or more programs implementing the present invention. The main memory may also store operating system software, as well as other software for operation of the computer system.

This configuration creates an advantageous situation wherein the broadcast network affiliate station or cable headend may receive a compressed digital television stream as a national feed, and locally generated graphics, text and/or still images from a computer can be inserted directly on top of the MPEG stream by an MPEG Remultiplexer. This can be used to avoid the need for decompressing and recompressing the television signal. The data files can be transferred from the computer system 304 to the Remultiplexer using a standard PC network connection.

Figure 4:
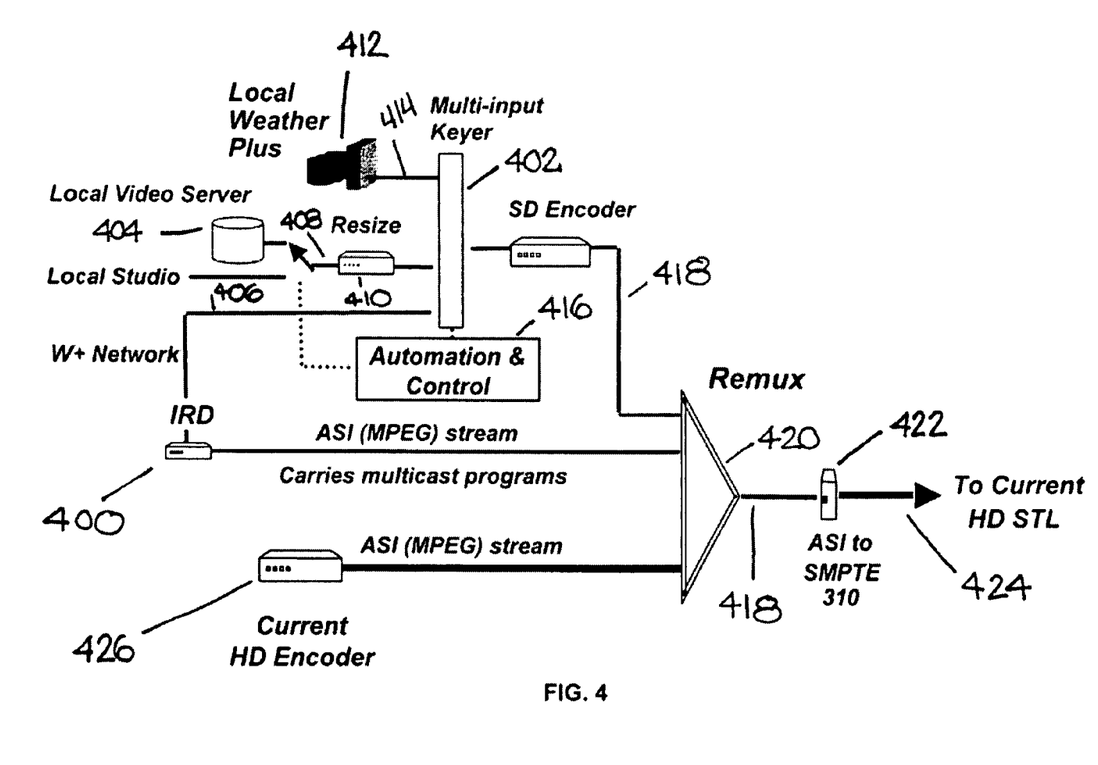
FIG. 4 is a diagram of a local content insertion system for graphics and full motion video in accordance with an embodiment of the invention.

FIG. 4 shows an embodiment of a system for allowing a local broadcast network affiliate station or cable headend to insert locally generated video content and/or locally generated graphics, text or still images into one or more of the modifiable segments in incoming centrally generated content. The system allows for the incoming compressed centrally generated content to be decompressed to enable more complex processing.

In FIG. 4 centrally generated content is decompressed by IRD 400. The centrally generated content preferably includes data which indicates the position of segments in the centrally generated content that can be modified to include local content. The decompressed video signal 406 is delivered to a multi-input keyer 402. In addition, locally generated graphic, text or still images 414 can be delivered to multi-input keyer 402 from computer system 412. A local video server 404 can be used to supply locally generated video content 408 to multi-input keyer 402. The locally generated video content 408 is preferably resized by scaler 410 to fit into one or more of the modifiable segments in incoming centrally generated content.

In addition, the automation and control of the combination of the video streams 324, 408 and 406 can be handled by known computer system 416 properly configured. The main memory of which may store one or more programs implementing the present invention.

The multi-input keyer allows the system to select which feed to use on a segment by segment basis according to the data supplied with the centrally generated content. The resulting combined final DTV multiplex signal 418 is created by MPEG Remultiplexer 420, including other MPEG programs, such as a primary network program that is encoded using HD MPEG encoder 426. In the case of this baseband processing architecture example, the preferred macroblock alignment described previously remains beneficial for reducing the artifacts associated with multiple compressions.

The combined DTV multiplex signal 418 can subsequently be converted into SMPTE 310 or other standard interface format at 422 before being delivered to an over-the-air transmitter via a HDTV Studio-Transmitter Link (STL) 424 for delivery to viewers and/or to a cable transmitter (not shown).

Figure 5:
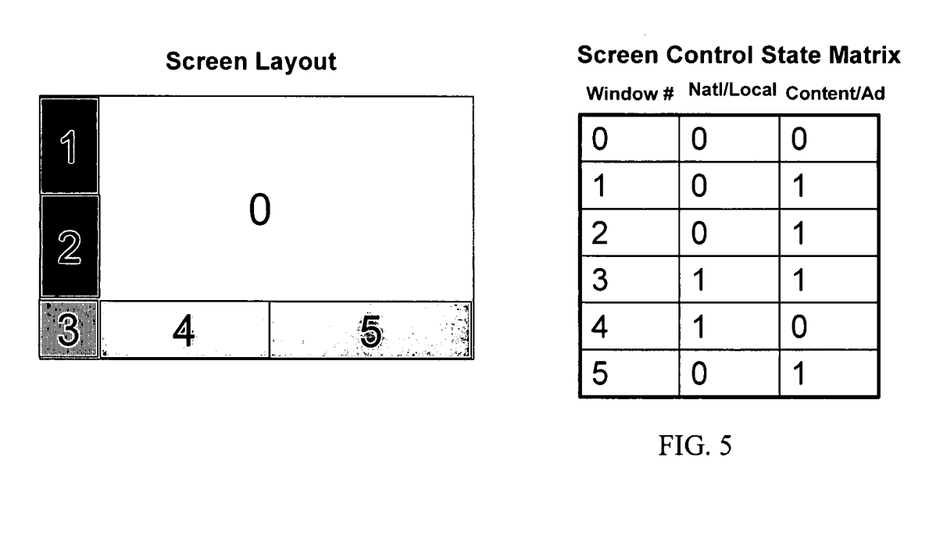
FIG. 5 is a diagram of a screen layout and a screen control state matrix for the screen layout in accordance with an embodiment of the invention.

Another aspect of this invention is the data that indicates what portion of the centrally generated video content may be modified. FIG. 5 shows one embodiment in which the data is organized into a screen control state matrix. As shown in FIG. 5, the matrix can be a simple table including a numerical list of windows in a screen layout. The windows correspond to portions of the screen. A simple binary entry can be used to indicate whether national or local content can be in each window. For example, a 1 can be used to indicate that the national content can be replaced with local content. In addition to local and national content, other indicators may be extended to specify whether "content" or "advertising" should be placed in each window.

Figure 6:
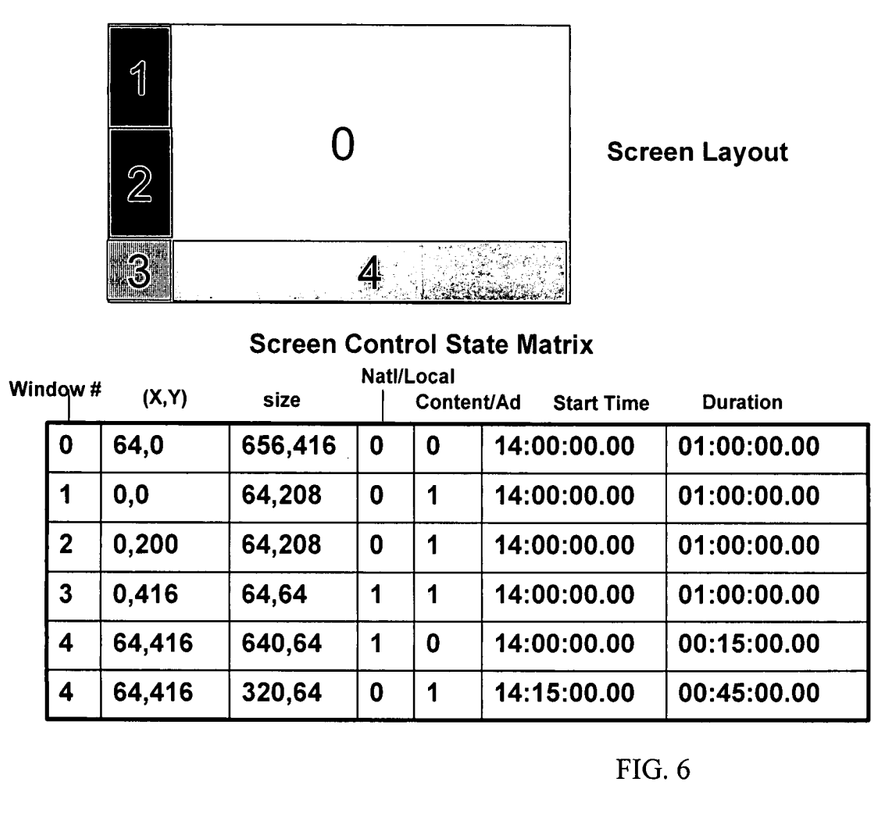
FIG. 6 is a diagram of a screen layout and a screen control state matrix including time data for the screen layout in accordance with an embodiment of the invention.

FIG. 6 shows an embodiment in which the screen control state matrix is further extended to include a description of the window locations and sizes, in order to allow flexible reformatting of the screen. In order to allow accurate time synchronization of events, the matrix may also include a time indicator for when the state should first be applied. In addition, the screen states may be specified not only in binary or numerical form, but in many possible syntaxes, such as XML descriptors. Although not shown, the matrix may also specify whether the audio portion of the program may also be modified.

Preferably, the control state matrix or other data that indicates what portion of the centrally generated content may be modified is distributed in-band with the centrally generated content. For example, in the case where the national feed is an MPEG-2 compressed signal, the data may be multiplexed into the MPEG stream using any of several techniques, including the use of private user data or as extensions to the SCTE 35 Digital Program Insertion protocol. For analog television, the data may be encoded into the vertical blanking interval (VBI) or horizontal blanking interval (HBI). In addition, data may also be sent by out-of-band means such as by Internet or other data network delivery.

Although the above description is provided in the context of a national and local television broadcast, one of ordinary skill in the art would realized that the invention is not limited to these embodiments. For example, the invention could be used to efficiently modify any combination of content streams including internet content, radio content and digital radio content.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The invention claimed is:

1. A method of distributing customizable program content comprising:
   distributing a program comprising multiple program segments configured to be displayed spatially adjacent to one another simultaneously on different portions of a display, and
   distributing spatial location data comprising an indication of which segments can be subsequently modified,
   wherein the data and program are distributed simultaneously as part of a common program signal having a compressed format and the multiple program segments are horizontally and vertically sized as distributed to have spatial dimensions that are an integer multiple of a macroblock size, wherein at least one of the program segments includes a plurality of macroblocks, and wherein edges of the multiple program segments are aligned with macroblock boundaries.

2. The method of claim 1, wherein the program is a television program.

3. The method of claim 1, wherein the program is a web site.

4. The method of claim 1, wherein the data further comprises the location of one or more program segments.

5. The method of claim 1, wherein the data further comprises the size of one or more program segments.

6. The method of claim 1, wherein the data further comprises the duration of one or more program segments.

7. The method of claim 1, wherein the program signal is a nationally broadcast television program.

8. The method of claim 1, further comprising modifying one or more program segments.

9. The method of claim 8, wherein modifying the one or more program segments comprises replacing the one or more program segments with local content.

10. The method of claim 8, wherein modifying the one or more program segments comprises modifying only part of one or more segments.

11. The method of claim 8, further comprising distributing the modified program to one or more users.

12. A method of distributing customizable program content comprising:
   distributing a television program comprising multiple program segments configured to be displayed spatially adjacent to one another simultaneously on different portions of a display, and
   distributing spatial location data comprising an indication of which segments can be subsequently modified,
   wherein the data and the television program are distributed simultaneously as part of the same program signal.

13. The method of claim 12, wherein the program signal is a digital program signal.

14. The method of claim 12, wherein the program signal is in MPEG-2 format.

15. The method of claim 12, wherein the program signal is in a compressed format and the multiple program segments are horizontally and vertically sized to have dimensions that are an integer multiple of a macroblock size, and wherein edges of the multiple program segments align with macroblock boundaries.

16. The method of claim 12, wherein the program signal is an analog program signal.

17. A method of distributing customizable program content comprising:
   distributing a program comprising multiple program segments configured to be displayed spatially adjacent to one another simultaneously on different portions of a display, and
   distributing spatial location data comprising an indication of which segments can be subsequently modified,
   wherein the program signal is in MPEG-2 format and the multiple program segments are horizontally and vertically sized as distributed to have spatial dimensions that are an integer multiple of a macroblock size, wherein at least one of the program segments includes a plurality of macroblocks, and wherein edges of the multiple program segments align with macroblock boundaries.

18. A method of customizing program content comprising:
   receiving a program in a compressed format, the program comprising multiple program segments configured to be displayed spatially adjacent to one another simultaneously on different portions of a display, the multiple program segments horizontally and vertically sized as distributed to have dimensions that are an integer multiple of a macroblock size,
   receiving spatial location data comprising an indication of which segments can be subsequently modified, and
   modifying one or more segments to produce a modified program including aligning edges of the multiple program segments with macroblock boundaries, at least one of the program segments including a plurality of macroblocks.

19. The method of claim 18, further comprising distributing the modified program to one or more users.

20. The method of claim 18, further comprising distributing the modified program to a plurality of users.

21. The method of claim 18, wherein the program is a television program.

22. The method of claim 18, wherein the program is a web site.

23. The method of claim 18, wherein the data further comprises the location of one or more program segments.

24. The method of claim 18, wherein the data further comprises the size of one or more program segments.

25. The method of claim 18, wherein the data further comprises the duration of one or more program segments.

26. The method of claim 18, wherein the program is a nationally broadcast television program.

27. A method of customizing program content comprising:
   receiving a television program comprising multiple program segments configured to be displayed spatially adjacent to one another simultaneously on different portions of a display,
   receiving spatial location data comprising an indication of which segments can be subsequently modified, and
   modifying one or more segments to produce a modified program,
   wherein the data and the television program are received simultaneously as part of the same program signal.

28. The method of claim 27, wherein the program is received in digital format.

29. The method of claim 27, wherein the program signal is in MPEG-2 format.

30. The method of claim 27, wherein the program signal is in MPEG-2 format and the multiple program segments are horizontally and vertically sized to have dimensions that are an integer multiple of a macroblock size, and wherein edges of the multiple program segments align with macroblock boundaries.

31. The method of claim 27, wherein the program signal is in a compressed format and the multiple program segments are horizontally and vertically sized to have dimensions that are an integer multiple of a macroblock size, and wherein edges of the multiple program segments align with macroblock boundaries.

32. The method of claim 27, wherein the program signal is an analog program signal.

33. A non-transitory computer readable media having computer readable code stored on a programmed computer system which when executed by the computer system causes the computer system to implement a method for customizing program content, comprising:
   modifying a program comprising multiple program segments configured to be displayed spatially adjacent to one another simultaneously utilizing spatial location data comprising an indication of which segments may be modified including aligning edges of the multiple program segments with macroblock boundaries, at least one of the program segments including a plurality of macroblocks.

34. The computer readable media of claim 33, wherein the data further comprises a location, size or timing of the segments.

35. A system for customizing program content comprising:
a computer system, and
an application program for modifying a program comprising multiple program segments configured to be displayed spatially adjacent to one another simultaneously utilizing spatial location data comprising an indication of which segments may be modified including aligning edges of the multiple program segments with macroblock boundaries, at least one of the program segments including a plurality of macroblocks.

36. The system of claim 35, wherein the data further comprises a location, size or timing of the segments.

\* \* \* \* \*